United States Patent
Ramasubramonian et al.

(10) Patent No.: US 9,532,046 B2
(45) Date of Patent: Dec. 27, 2016

(54) REFERENCE PICTURE SET PREDICTION FOR VIDEO CODING

(71) Applicant: QUALCOMM Incorporated, San Diego, CA (US)

(72) Inventors: Adarsh Krishnan Ramasubramonian, San Diego, CA (US); Ying Chen, San Diego, CA (US); Ye-Kui Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 920 days.

(21) Appl. No.: 13/862,282

(22) Filed: Apr. 12, 2013

(65) Prior Publication Data

US 2013/0272403 A1 Oct. 17, 2013

Related U.S. Application Data

(60) Provisional application No. 61/625,075, filed on Apr. 16, 2012.

(51) Int. Cl.
| | |
|---|---|
| *H04B 1/66* | (2006.01) |
| *H04N 19/50* | (2014.01) |
| *H04N 19/463* | (2014.01) |
| *H04N 19/70* | (2014.01) |
| *H04N 19/58* | (2014.01) |

(52) U.S. Cl.
CPC ...... *H04N 19/00569* (2013.01); *H04N 19/463* (2014.11); *H04N 19/58* (2014.11); *H04N 19/70* (2014.11)

(58) Field of Classification Search
None
See application file for complete search history.

(56) References Cited

U.S. PATENT DOCUMENTS

| | | | |
|---|---|---|---|
| 2012/0328023 A1 | 12/2012 | Sprljan et al. | |
| 2013/0188881 A1* | 7/2013 | Zhao | H04N 19/463 382/232 |

FOREIGN PATENT DOCUMENTS

| | | |
|---|---|---|
| WO | 2013002701 A1 | 1/2013 |

OTHER PUBLICATIONS

Bossen et al., "HM Software Manual," JCTVC—Software Manual, Joint Collaborative Team on Video Coding (JCTVC) of ITU-T SG16 WP3 and ISO/IEC JTC1/SC29/WG11, 10th Meeting: Stockholm, SE, Jul. 11-20, 2012, 16 pages.

(Continued)

*Primary Examiner* — Tat Chio
(74) *Attorney, Agent, or Firm* — Shumaker & Sieffert, P.A.

(57) ABSTRACT

In one example, a device for decoding video data includes a video decoder configured to decode one or more syntax elements of a current reference picture set (RPS) prediction data structure, wherein at least one of the syntax elements represents a picture order count (POC) difference between a POC value associated with the current RPS and a POC value associated with a previously decoded RPS, form a current RPS based at least in part on the RPS prediction data structure and the previously decoded RPS, and decode one or more pictures using the current RPS. A video encoder may be configured to perform a substantially similar process during video encoding.

35 Claims, 6 Drawing Sheets

(56) References Cited

OTHER PUBLICATIONS

Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.
Bross et al., "High efficiency video coding (HEVC) text specification draft 7," 9th Meeting: Geneva, CH, Apr. 27-May 7, 2012, JCTVC-I1003_d2, 290 pp.
Bross et al., "High efficiency video coding (HEVC) text specification draft 8," 10th Meeting: Stockholm, SE, Jul. 11-20,2012, JCTVC-J1003_d7, 261 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 9," 11th Meeting: Shanghai, CN, Oct. 10-19, 2012, JCTVC-K1003_v7, 290 pp.
Bross et al., "WD4: Working Draft 4 of High-Efficiency Video Coding," 6th Meeting: JCTVC-F803_d2, Torino, IT, Jul. 14-22, 2011, 226 pp.
Bross et al., "WD5: Working Draft 5 of High-Efficiency Video Coding," 7th Meeting: Geneva, Switzerland, Nov. 21-30, 2011, JCTVC-G1103_d2, 214 pp.
Hannuksela, et al., "AHG21: Removal of reference picture list modification", JCT-VC Meeting; MPEG Meeting; Jan. 2, 2012-Oct. 2, 2012; San Jose; (Joint Collaborative Team on Video Coding of ISO/IEC JTC1/SC29/ WG11 and ITU-T SG.16 ); URL: http://wftp3.itu.int/ a v -arch/ jctvc-site/, No. JCTVC-H0426, XP030111453.
International Search Report and Written Opinion—PCT/US2013/036642—ISA/EPO—Jul. 16, 2013, 12 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
Ramasubramonian, et al., "AHG13: On inter-RPS prediction", JCT-VC Meeting; MPEG Meeting; Nov. 7, 2012- Jul. 20, 2012; Stockholm; (Joint Collaborative Team on Video Coding of ISO/IEC JTC1/SC29/WG11 and ITU-T SG.16 ); URL: http://wftp3.1tu .1 nt/ a v -arch/jctvc-site/, No. JCTVC-J0117, XP030112479, 6 pp.
Ramasubramonian, et al., "AHG15: On inter-RPS prediction", JCT-VC Meeting; MPEG Meeting; Apr. 27, 2012-May 7, 2012; Geneva; (Joint Collaborative Team on Video Coding of ISO/IEC JTC1/SC291WG11 and ITU-T SG.16 ); URL: http://wftp3.1tu.int/ av-arch/jctvc-site/, No. JCTVC-10347, Apr. 17, 2012, XP030112110, 5 pp.
Tan, "AHG21: Inter reference picture set prediction syntax and semantics," JCTVC-G198, Joint Collaborative Team on Video Coding (JCT-VC) of ITU-T SG16 WP3 and ISO/IEC JTC1/SC291WG11, 7th Meeting: Geneva, CH, Nov. 21-30, 2011, 7 pp.
Wiegand et al., "WD1: Working Draft 1 of High-Efficiency Video Coding", JCTVC-C403, 3rd Meeting: Guangzhou, CN, Oct. 7-15, 2010, 137 pp.
Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.
ITU-T H.265, Series H: Audiovisual and Multimedia Systems, Infrastructure of audiovisual services—Coding of moving video, Advanced video coding for generic audiovisual services, the International Telecommunication Union. Apr. 2013, 317 pp.

\* cited by examiner

REFERENCE PICTURE SET PREDICTION FOR VIDEO CODING

This application claims the benefit of U.S. Provisional Application Ser. No. 61/625,075, filed Apr. 16, 2012, the entire contents of which are hereby incorporated by reference.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards, such as Multiview Video Coding (MVC) and Scalable Video Coding (SVC). A working draft (working draft 6) of HEVC is available from http://phenix.it-sudparis.eu/jct/doc_end_user/documents/8_San%20Jose/wg11/JCTVC-H1003-v22.zip. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

This disclosure describes techniques for reference picture set (RPS) prediction for video coding, e.g., video encoding and video decoding. In particular, the disclosure describes various methods for signaling a reference picture set (RPS). Various examples are proposed to enable simpler and more efficient signaling of inter-RPS prediction. This disclosure generally describes techniques for predicting a current RPS from a previously coded RPS, referred to herein as a reference RPS. A coded syntax element may represent a picture order count (POC) difference between a POC value associated with the current RPS and a POC value associated with the previously coded RPS. Thus, a video encoder may determine the RPS to use as a reference RPS using another syntax element and signal the POC difference, and a video decoder may use the POC difference to derive the current RPS from the reference RPS. The video encoder may signal data indicative of pictures to be added to and/or removed from the reference RPS to form the current RPS. Likewise, the video decoder may use signaled information to add pictures to and/or remove pictures from the reference RPS to form the current RPS.

In one example, a method of decoding video data includes decoding one or more syntax elements of a current reference picture set (RPS) prediction data structure, wherein at least one of the syntax elements represents a picture order count (POC) difference between a POC value associated with the current RPS and a POC value associated with a previously decoded RPS, forming a current RPS based at least in part on the RPS prediction data structure and the previously decoded RPS, and decoding one or more pictures using the current RPS.

In another example, a device for decoding video data includes a video decoder configured to decode one or more syntax elements of a current reference picture set (RPS) prediction data structure, wherein at least one of the syntax elements represents a picture order count (POC) difference between a POC value associated with the current RPS and a POC value associated with a previously decoded RPS, form a current RPS based at least in part on the RPS prediction data structure and the previously decoded RPS, and decode one or more pictures using the current RPS.

In another example, a device for decoding video data includes means for decoding one or more syntax elements of a current reference picture set (RPS) prediction data structure, wherein at least one of the syntax elements represents a picture order count (POC) difference between a POC value associated with the current RPS and a POC value associated with a previously decoded RPS, means for forming a current RPS based at least in part on the RPS prediction data structure and the previously decoded RPS, and means for decoding one or more pictures using the current RPS.

In another example, a computer-readable storage medium has stored thereon instructions that, when executed, cause a processor to decode one or more syntax elements of a current reference picture set (RPS) prediction data structure, wherein at least one of the syntax elements represents a picture order count (POC) difference between a POC value associated with the current RPS and a POC value associated with a previously decoded RPS, form a current RPS based at least in part on the RPS prediction data structure and the previously decoded RPS, and decode one or more pictures using the current RPS.

In another example, a method of encoding video data includes encoding a current picture using one or more reference pictures, forming a current reference picture set (RPS) including the one or more reference pictures, and encoding one or more syntax elements of an RPS prediction data structure for the current RPS, wherein at least one of the syntax elements represents a picture order count (POC) difference between a POC value associated with the current RPS and a POC value associated with a previously encoded RPS, and wherein the RPS prediction data structure indicates how to form at least a portion of the current RPS using the previously encoded RPS.

In another example, a device for encoding video data includes a video encoder configured to encode a current picture using one or more reference pictures, form a current reference picture set (RPS) including the one or more reference pictures, and encode one or more syntax elements of an RPS prediction data structure for the current RPS, wherein at least one of the syntax elements represents a picture order count (POC) difference between a POC value associated with the current RPS and a POC value associated with a previously encoded RPS, and wherein the RPS prediction data structure indicates how to form at least a portion of the current RPS using the previously encoded RPS.

The details of one or more examples are set forth in the accompanying drawings and the description below. Other features, objects, and advantages will be apparent from the description and drawings, and from the claims.

DETAILED DESCRIPTION

Figure 1:
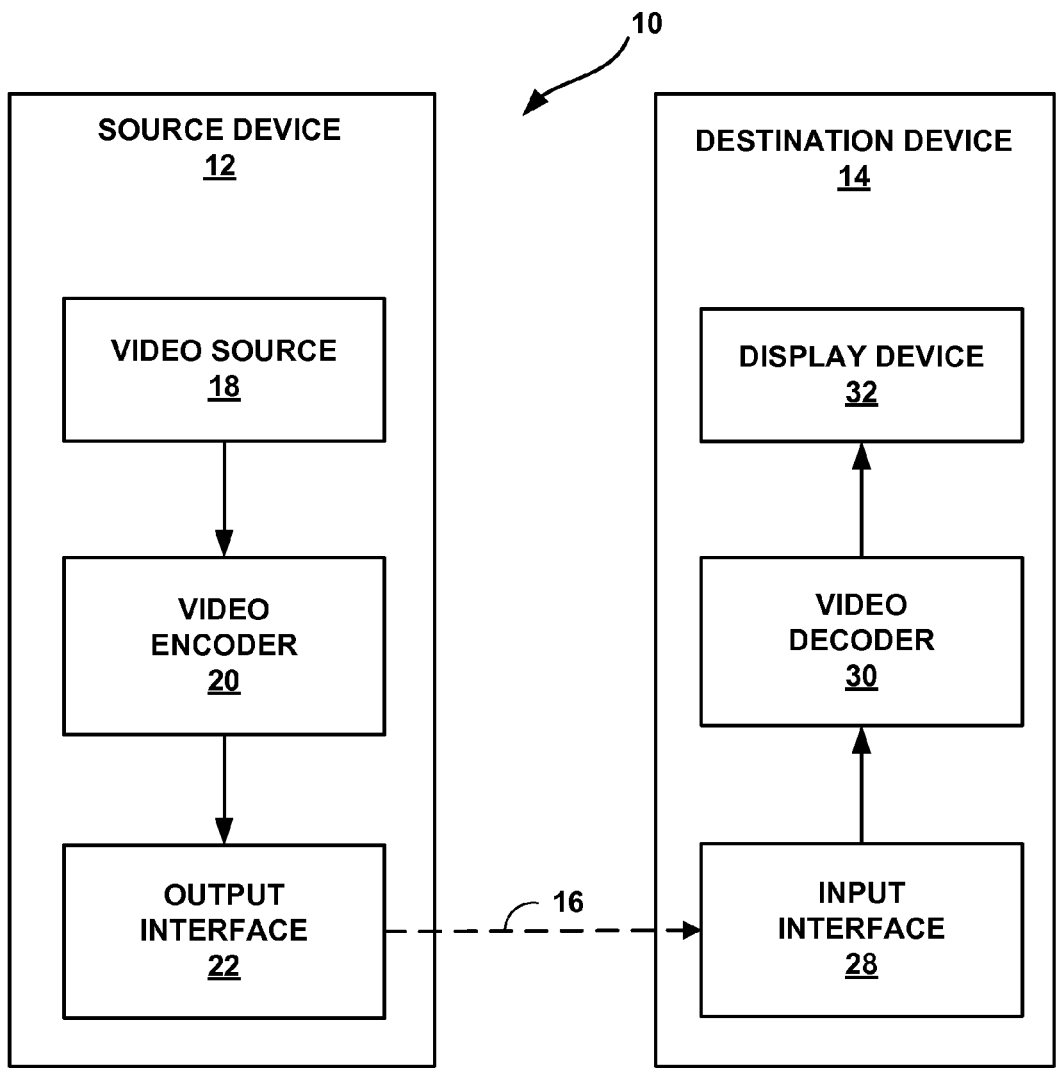
FIG. 1 is a block diagram illustrating an example video encoding and decoding system that may utilize techniques for reference picture set (RPS) prediction.

This disclosure describes techniques for reference picture set (RPS) prediction for video coding, e.g., video encoding and video decoding. The term "video coder" may generally refer to either a video encoder or a video decoder. An RPS corresponds to a set of reference pictures associated with a picture, including reference pictures that are prior to the associated picture in decoding order, that may be used for inter prediction of the associated picture or any picture following the associated picture in decoding order. This disclosure describes various example techniques that may enable simpler and more efficient signaling of RPSs for inter-prediction, e.g., using inter-RPS prediction.

The description in this disclosure is based on and makes reference to Working Draft 6 of the High Efficiency Video Coding (HEVC) standard currently under development by the Joint Collaborative Team on Video Coding (hereinafter HEVC WD6). WD6 is described in "High efficiency video coding (HEVC) text specification draft 6," Bross et al., JCTVC-H1003, presented at Joint Collaborative Team on Video Coding (JCT-VC) of ITU-T SG16 WP3 and ISO/IEC JTC1/SC29/WG11, 8th Meeting: San Jose, Calif., USA, 1-10 February.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

In addition, the upcoming High-Efficiency Video Coding (HEVC) standard is being developed by the Joint Collaboration Team on Video Coding (JCT-VC) of ITU-T Video Coding Experts Group (VCEG) and ISO/IEC Motion Picture Experts Group (MPEG). Working Draft 6 (WD6) of HEVC, identified above, and referred to as HEVC WD6 or WD6, is available from http://phenix.int-evry.fr/jct/doc_end_user/documents/8_San%20Jose/wg11/JCTVC-H1003-v21.zip.

HEVC WD6 describes the use of an RPS-based mechanism to manage reference pictures. As discussed above, a reference picture set refers to a set of reference pictures associated with a picture, which many include any or all reference pictures that are prior to the associated picture in decoding order, and that may be used for inter prediction of the associated picture or any picture following the associated picture in decoding order.

In HEVC, an RPS for each coded picture is directly signaled. Syntax elements for signaling of RPS are included in both the sequence parameter set (SPS) and the slice header. For a particular coded picture, the RPS may be one of the alternative sets included in the SPS as indicated by a flag in the slice header, or directly signaled in the slice header.

The reference picture set for each picture may include five different lists of reference pictures, also referred to as the five RPS subsets: RefPicSetStCurrBefore, RefPicSetStCurrAfter, RefPicSetStFoll, RefPicSetLtCurr, and RefPicSetLtFoll. RefPicSetStCurrBefore includes short-term reference pictures (STRPs) that are prior to the current picture in both decoding order and output order, and that may be used in inter prediction of the current picture. RefPicSetStCurrAfter includes short-term reference pictures that are prior to the current picture in decoding order, that succeed the current picture in output order, and that may be used in inter prediction of the current picture. RefPicSetStFoll includes short-term reference pictures that may be used in inter prediction of one or more of the pictures following the current picture in decoding order, and that are not used in inter prediction of the current picture. RefPicSetLtCurr includes long-term reference pictures that may be used in inter prediction of the current picture. RefPicSetLtFoll includes long-term reference pictures that may be used in inter prediction of one or more of the pictures following the current picture in decoding order, and that are not used in inter prediction of the current picture.

This disclosure describes techniques for coding an RPS using inter-RPS prediction. For inter-RPS prediction, the inter reference picture set prediction syntax may exploit the fact that the reference picture set of the current picture can be predicted from the reference picture set of the previously decoded picture. This is because all the reference pictures of the current picture must either be reference pictures of the previous picture or the previously decoded picture itself. It is only necessary to indicate which of these pictures should be reference pictures and be used for the prediction of the current picture.

Therefore, the syntax may include the following: an index to point to the reference picture set to use as a predictor, a delta POC to be added to the delta POC of the predictor to obtain the delta POC of the current reference picture set and a set of indicators to indicate which pictures are reference pictures and whether they are used for the prediction of the current picture or for future pictures.

The related syntax for inter-RPS signaling is highlighted by italics in the following table (Table 1):

TABLE 1

Short-term reference picture set syntax

| short_term_ref_pic_set( idx ) { | Descriptor |
|---|---|
| *inter_ref_pic_set_prediction_flag* | *u(1)* |
| *if( inter_ref_pic_set_prediction_flag ) {* | |
| *delta_idx_minus1* | *ue(v)* |
| *delta_rps_sign* | *u(1)* |
| *abs_delta_rps_minus1* | *ue(v)* |
| *for( j = 0; j <= NumDeltaPocs[ RIdx ]; j++ ) {* | |
| *used_by_curr_pic_flag[ j ]* | *u(1)* |
| *if( !used_by_curr_pic_flag[ j ] )* | |
| *use_delta_flag[ j ]* | *u(1)* |
| } | |
| } | |
| else { | |
| num_negative_pics | ue(v) |
| num_positive_pics | ue(v) |
| for( i = 0; i < num_negative_pics; i++ ) { | |
| delta_poc_s0_minus1[ i ] | ue(v) |
| used_by_curr_pic_s0_flag[ i ] | u(1) |
| } | |
| for( i = 0; i < num_positive_pics; i++ ) { | |
| delta_poc_s1_minus1[ i ] | ue(v) |
| used_by_curr_pic_s1_flag[ i ] | u(1) |
| } | |
| } | |
| } | |

This disclosure recognizes certain potential problems associated with the inter-RPS design in HEVC. First, the syntax layout is complicated, a lot of syntax elements are introduced, and some might be unnecessary. In some cases, when the RPS of a picture A is used to predict the RPS of a picture B, most likely the picture A will be added into the RPS of the picture B. This is especially true when the RPS only contains the pictures with a lower or equal temporal level of the current picture. In most cases, used_by_curr_pic_flag can be predicted from the flags associated with the reference RPS. It is less efficient to still signal this flag for inter-RPS prediction.

Various example techniques are described in this disclosure that may enable simpler and more efficient signaling of inter-RPS prediction structure. The examples of the disclosure can be generally summarized as follows (though it should be understood that additional and/or alternative examples may be performed). In some examples, an inter-predicted RPS can include not only the pictures in a reference RPS, but also the current picture of a reference RPS. In addition, or in the alternative, the used_by_curr_pic_flag syntax element for each reference picture in the inter-predicted RPS need not always signalled, but may be derived to be the same value as that flag of the corresponding picture in the reference RPS. In addition, or in the alternative, the delta_rps_sign and abs_delta_rps_minus1 syntax elements may be merged into one syntax element.

FIG. 1 is a block diagram illustrating an example video encoding and decoding system 10 that may be configured to utilize techniques for RPS prediction as described in this disclosure. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for reference picture set (RPS) prediction as described in this disclosure. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for reference picture set (RPS) prediction as described in this disclosure may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC and HEVC.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

The JCT-VC is working on development of the HEVC standard, as discussed above. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up," "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, e.g., as proposed for HEVC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video encoder 20 may further send syntax data, such as block-based syntax data, frame-based syntax data, and GOP-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

In accordance with the techniques of this disclosure, video encoder 20 and video decoder 30 may be configured to code data representative of reference picture sets and reference picture lists in a relatively more efficient manner. Various examples (Examples 1-5) are explained below. However, it should be understood that various aspects of these examples may be used in any combination.

In general, video encoder 20 may be configured to signal data representative of whether reference pictures in a previously encoded reference picture set (e.g., a reference picture set for a previously encoded picture) should be included in, or excluded from, a current reference picture set (e.g., a reference picture set for a current picture). The previously encoded reference picture set (RPS) may be referred to as a "reference RPS." Certain reference pictures in the reference RPS may be included in the current RPS, as indicated by video encoder 20. For instance, as explained in the various examples below, the reference pictures in the reference RPS may all be included in the current RPS, except for certain exceptions as also signaled by video encoder 20. Video encoder 20 may further code data that identifies the reference RPS. For example, video encoder 20 may signal a difference between the POC value for the current picture and the POC value for the picture to which the reference RPS corresponds.

In this manner, video encoder 20 may be configured to encode a current picture using one or more reference pictures, form a current reference picture set (RPS) including the one or more reference pictures, and encode one or more syntax elements of an RPS prediction data structure for the current RPS, wherein at least one of the syntax elements represents a picture order count (POC) difference between the current RPS and a previously encoded RPS, and wherein the RPS prediction data structure indicates how to form at least a portion of the current RPS using the previously encoded RPS. In particular, video encoder 20 may be configured to encode one or more blocks of the current picture in an inter-prediction mode (e.g., P-mode or B-mode), where video encoder 20 may predict the blocks from one or more of the pictures in the reference picture set. Video encoder 20 may use the syntax data described with respect to Examples #1-#5 below to encode the one or more syntax elements, or video encoder 20 may use similar syntax to encode data representative of reference pictures from a reference RPS that can be included in or excluded from a current RPS.

In Example #1, syntax of the short term reference picture set data may be modified, as shown in Table 2 below. In particular, certain syntax elements may be removed (as shown using strikethrough text) while other syntax elements may be added (as shown using underlined text).

TABLE 2

Short-term reference picture set syntax

| | Descriptor |
|---|---|
| short_term_ref_pic_set( idx ) { | |
|   inter_ref_pic_set_prediction_flag | u(1) |
|   if( inter_ref_pic_set_prediction_flag ) { | |
|     delta_idx_minus1 | ue(v) |
|     [removed: "delta_rps_sign"] | [removed: "u(1)"] |
|     [removed: "abs_delta_rps_minus1"] | [removed: "ue(v)"] |
|     *delta_rps_minus1* | *ie(v)* |
|     [removed: "for( j = 0; j <= NumDeltaPocs[ RIdx ]; j++ ) {"] | |
|       [removed: "use_by_curr_pic_flag[ j ]"] | [removed: "u(1)"] |
|       [removed: "if( !used_by_curr_pic_flag[ j ] )"] | |
|         [removed: "use_delta_flag[ j ]"] | [removed: "u(1)"] |
|     [removed: "}"] | |
|     *add_predictor_rps_pic_flag* | *u(1)* |
|   } | |
|   else { | |
|     num_negative_pics | ue(v) |
|     num_positive_pics | ue(v) |
|     for( i = 0; i < num_negative_pics; i++ ) { | |
|       delta_poc_s0_minus1[ i ] | ue(v) |
|       used_by_curr_pic_s0_flag[ i ] | u(1) |
|     } | |
|     for( i = 0; i < num_positive_pics; i++ ) { | |
|       delta_poc_s1_minus1[ i ] | ue(v) |
|       used_by_curr_pic_s1_flag[ i ] | u(1) |
|     } | |
|   } | |
| } | |

The semantics for the additional syntax elements of Table 2 may be defined as follows:

The syntax element add_predictor_rps_pic_flag in Table 2 above equal to 1 may indicates the current picture of the reference RPS (with index equal to RIdx=idx−delta_idx_minus1−1) is included in the RPS with index equal to idx. Add_predictor_rps_pic_flag equal to 0 may indicate that the current picture of the reference RPS (with index equal to RIdx) is not included in the RPS with index equal to idx.

In this manner, add_predictor_rps_pic_flag represents an example of a syntax element representative of whether a previously encoded picture (or previously decoded picture, from the perspective of video decoder 30), to which the reference RPS corresponds, is to be included in the reference picture set. When video encoder 20 includes the previously encoded picture to which the reference RPS corresponds in the current RPS for a current picture, video encoder 20 may set a value of 1 for add_predictor_rps_pic_flag. Video encoder 20 may determine to include the previously encoded picture to which the reference RPS corresponds in the current RPS when one or more blocks of the current picture are encoded relative to the previously encoded picture (e.g., as determined through encoding results according to rate-distortion optimization (RDO)). Thus, video decoder 30 may use the value of add_predictor_rps_pic_flag to determine whether to include the previously decoded picture in the current RPS. In this manner, forming the current RPS for the current picture may include adding data representative of the previously decoded picture to the reference picture set when the syntax element (e.g., add_predictor_rps_pic_flag) indicates that the previously decoded picture is to be included in the reference picture set.

The syntax element delta_rps_minus1 may specify the POC difference between picA and picB, where picA is associated with DeltaPoc[RIdx] and picB is associated with DeltaPoc[idx]. In this example, "picA" is called the current picture of DeltaPoc[RIdx] and "picB" is called the current picture of DeltaPoc[idx].

The variable DeltaRPS may be derived as follows:

DeltaRPS=sign(delta_rps_minus1)?(delta_rps_minus1+1): (delta_rps_minus1−1).

In this manner, delta_rps_minus1 represents an example of a syntax element that represents a picture order count (POC) difference between the current RPS and a previously coded RPS.

Alternatively, delta_rps_minus1 can be signalled with fixed length signed integer, and the length of it is equal to log 2_max_pic_order_cnt_lsb_minus4+5. Therefore, delta_rps_minus1 may have a value in the range of −max_pic_order_cnt_lsb and max_pic_order_cnt_lsb−1, inclusive.

In accordance with Example #1, video decoder 30 may be configured to perform a decoding process that includes the following. When inter_ref_pic_set_prediction_flag is equal to 1, video decoder 30 may derive values for the variables DeltaPocS0[idx][i0], UsedByCurrPicS0[idx][i0], DeltaPocS1[idx][i1], UsedByCurrPicS1[idx][i1], NumNegativePics[idx] and NumPositivePics[idx] as follows in the pseudocode below:

```
for( j = 0, i0 = 0, i1 = 0, insertFlag = add_predictor_rps_pic_flag ;
j <= NumDeltaPocs[
RIdx ]; j++ ) {
    if ((DeltaPocSorted[ RIdx ][ j ]> DeltaRPS || j==
NumDeltaPocs[ RIdx ]) &&insert_flag) {
        DPoc = DeltaRPS
        currFlag = 1
        insertFlag = 0
        if (j< NumDeltaPocs[RIdx]) j−−
    else {
        DPoc = DeltaPocSorted[ RIdx ][ j ] + DeltaRPS
        currFlag = UseByCurrPic[ RIdx ][ j ]
    }
    if( DPoc < 0 ) {
        DeltaPocS0[ idx ][ i0 ] = DPoc                      (7-47)
        UsedByCurrPicS0[ idx ][ i0 ] = currFlag             (7-48)
        i0++
    }
    else {
        DeltaPocS1[ idx ][ i1 ] = DPoc                      (7-49)
        UsedByCurrPicS1[ idx ][ i1 ] = currFlag             (7-50)
        i1++
    }
}
```

| | |
|---|---|
| NumNegativePics[ idx ] = i0 | (7-51) |
| NumPositivePics[ idx ] = i1 | (7 52) |

Regardless of the value of inter_ref_pic_set_prediction_flag, video decoder 30 may perform the following process to derive a sorted list of delta POC values and the associated used_by_curr_pic_sx_flag values of the entries in the RPS.

Video decoder 30 may derive the arrays DeltaPocSorted[idx] and UsedByCurrPic[idx][ ] as follows:

```
for(j = 0, i = NumNegativePics[ idx ] - 1; i >= 0; i--, j++) {
    DeltaPocSorted[ idx ][ j ] = DeltaPocS0[ idx ][ i ]
    UsedByCurrPic[ idx ][ j ] = UsedByCurrPicS0[ idx ][ i ]
}
for(j = NumNegativePics[ idx ], i = NumNegativePics[ idx ] - 1; i < NumPositivePics[ idx ] + NumNegativePics[ idx ]; i++, j++) {
    DeltaPocSorted[ idx ][ j ] = DeltaPocS1[ idx ][ i ]
    UsedByCurrPic[ idx ][ j ] = UsedByCurrPicS1[ idx ][ i ]
}
```

Example #2 is similar to and based on Example #1 above, but with more flexibility. Video encoder 20 and video decoder 30 may be configured to code syntax elements in accordance with Table 3 below, when configured according to Example #2. Changes to the short-term reference picture set shown in Table 3 are highlighted with respect to Table 2 of Example #1, where underlined text represents additions relative to Table 2, and the additional syntax elements shown in Table 2 are omitted from Table 3.

TABLE 3

Short-term reference picture set syntax

| short_term_ref_pic_set( idx ) { | Descriptor |
|---|---|
| inter_ref_pic_set_prediction_flag | u(1) |
| if( inter_ref_pic_set_prediction_flag ) { | |
|     delta_rps_minus1 | ie(v) |
|     add_predictor_rps_pic_flag | u(1) |
|     <u>num_ref_pics_drops_from_begin</u> | <u>ue(v)</u> |
|     <u>num_ref_pics_drops_from_end</u> | <u>ue(v)</u> |
| } | |
| else { | |
|     num_negative_pics | ue(v) |
|     num_positive_pics | ue(v) |
|     for( i = 0; i < num_negative_pics; i++ ) { | |
|         delta_poc_s0_minus1[ i ] | ue(v) |
|         used_by_curr_pic_s0_flag[ i ] | u(1) |
|     } | |
|     for( i = 0; i < num_positive_pics; i++ ) { | |
|         delta_poc_s1_minus1[ i ] | ue(v) |
|         used_by_curr_pic_s1_flag[ i ] | u(1) |
|     } | |
| } | |
| } | |

The semantics for the additional syntax elements of Table 3 may be defined as follows:

The syntax element num_ref_pics_drops_from_begin in Table 3 above may specify the number of reference pictures starting from the beginning of the reference RPS (with index equal to RIdx) that are not used to predict the current RPS (with index equal to idx). Assume num_positive_pics and num_negative_pics of the reference RPS is RNPP and RNNP respectively. Num_ref_pics_drops_from_begin may have a value in the range of 0 to RNPP+RNNP−1.

The syntax element num_ref_pics_drops_from_end may specify the number of reference pictures starting from the end of the reference RPS (with index equal to RIdx) that are not used to predict the current RPS (with index equal to idx). Num_ref_pics_drops_from_begin may have a value in the range of 0 to RNPP+RNNP−1−num_ref_pics_drops_from_begin.

In this manner, num_ref_pics_drops_from_begin represents an example of a syntax element specifying a number of reference pictures, starting from the beginning of a previously decoded reference picture set, to be omitted from the reference picture set for the current picture, and num_ref_pics_drops_from_end represents an example of a syntax element specifying a number of reference pictures, starting from the end of the previously decoded reference picture set, to be omitted from the current reference picture set. Video decoder 30 may be configured to form a current RPS based on the values of these syntax elements, e.g., to exclude the reference pictures of the previously decoded reference picture set that are to be omitted as indicated by the syntax elements (e.g., by num_ref_pics_drops_from_begin and num_ref_pics_drops_from_end).

In some examples, video encoder 20 and video decoder 30 may sort the reference RPS (short-term) in a way that all the entries are ordered in ascending order of POC value.

Alternatively, num_ref_pics_drops_from_begin can be signalled as te(v).

Alternatively, num_ref_pics_drops_from_begin can be signalled as u(v), with ceil(log 2(RNPP+RNNP)) bits.

Alternatively, num_ref_pics_drops_from_end can be signalled as te(v).

Alternatively, num_ref_pics_drops_from_end can be signalled as u(v) with ceil(log 2(RNPP+RNNP−num_ref_pics_drops_from_begin)) bits.

In accordance with Example #2, video decoder 30 may be configured to perform a decoding process that includes the following. When inter_ref_pic_set_prediction_flag is equal to 1, video decoder 30 may derive values for the variables DeltaPocS0[idx][i0], UsedByCurrPicS0[idx][i0], DeltaPocS1[idx][i1], UsedByCurrPicS1[idx][i1], NumNegativePics[idx] and NumPositivePics[idx] as follows (where numbered lines in the format "(#-##)" refer to parts of the HEVC Working Draft):

```
for( j = num_ref_pics_drops_from_begin, i0 = 0, i1 = 0, insertFlag =
add_predictor_rps_pic_flag; j <= NumDeltaPocs[ RIdx ] -
num_ref_pics_drops_from_end; j++ ) {
    if ((DeltaPocSorted[ RIdx ][ j ]>DeltaRPS || j==
NumDeltaPocs[ RIdx ]-num_ref_pics_drops_from_end) &&
insert_flag) {
        DPoc = DeltaRPS
        currFlag = 1
        insertFlag = 0
        if (j< NumDeltaPocs[RIdx]) j--
    else {
        DPoc = DeltaPocSorted[ RIdx ][ j ] + DeltaRPS
        currFlag = UsedByCurrPic[ RIdx ][ j ]
    }
    if( DPoc < 0 ) {
        DeltaPocS0[ idx ][ i0 ] = DPoc                        (7-47)
        UsedByCurrPicS0[ idx ][ i0 ] = currFlag               (7-48)
        i0++
    } else {
        DeltaPocS1[ idx ][ i1 ] = DPoc                        (7-49)
        UsedByCurrPicS1[ idx ][ i1 ] = currFlag               (7-50)
        i1++
    }
}
NumNegativePics[ idx ] = i0                                   (7-51)
NumPositivePics[ idx ] = i1                                   (7 52)
```

Regardless of the value of inter_ref_pic_set_prediction_flag, video decoder 30 may perform the following process to derive a sorted list of delta POC values and the associated used_by_curr_pic_sx_flag values of the entries in the RPS. Video decoder 30 may derive the arrays DeltaPocSorted [idx] and UsedByCurrPic[idx][ ] as follows:

```
for( j = 0, i = NumNegativePics[ idx ] − 1; i >= 0; i−−, j++ ) {
    DeltaPocSorted[ idx ][ j ] = DeltaPocS0[ idx ][ i ]
    UsedByCurrPic[ idx ][ j ] = UsedByCurrPicS0[ idx ][ i ]
}
for( j = NumNegativePics[ idx ], i = NumNegativePics[ idx ] − 1; i <
NumPositivePics[ idx ] + NumNegativePics[ idx ]; i++, j++ ) {
    DeltaPocSorted[ idx ][ j ] = DeltaPocS1[ idx ][ i ]
    UsedByCurrPic[ idx ][ j ] = UsedByCurrPicS1[ idx ][ i ]
}
```

Example #3 is similar to Example #1 and Example #2, but syntax elements delta_rps_sign and abs_delta_rps_minus1 in the HEVC Working Draft are not merged into delta_rps_minus1.

Alternatively, abs_delta_rps_minus1 may be signalled with u(v) with log 2_max_pic_order_cnt_lsb_minus4+4 bits and have a value in the range of 0 to max_pic_order_cnt_lsb−1, inclusive.

Example #4 is similar to and based on Example #2, but with more flexibility. Changes to the short-term reference picture set shown in Table 4 are highlighted with respect to Table 3 of Example #2, where underlined text represents additions relative to Table 3, and the additional syntax elements of Table 3 are shown in Table 4.

TABLE 4

Short-term reference picture set syntax

| short_term_ref_pic_set( idx ) { | Descriptor |
|---|---|
|   inter_ref_pic_set_prediction_flag | u(1) |
|   if( inter_ref_pic_set_prediction_flag ) { | |
|     delta_rps_minus1 | ie(v) |
|     add_predictor_rps_pic_flag | u(1) |
|     num_ref_pics_drops_from_begin | ue(v) |
|     num_ref_pics_drops_from_end | ue(v) |
|     _all_ref_pics_used_by_curr_flag_ | _u(1)_ |
|     _if(!all_ref_pics_used_by_curr_flag){_ | |
|       _numPocs=NumDeltaPocs[RIdx]+_ | |
|       _add_predictor_rps_pic_flag-_ | |
|         _num_ref_pics_drops_from_begin-_ | |
|         _num_ref_pics_drops_from_end_ | |
|       _for(j=0;j<=numPocs;j++)_ | |
|         _used_by_curr_pic_flag[j]_ | _u(1)_ |
|     _}_ | |
|   } | |
|   else { | |
|     num_negative_pics | ue(v) |
|     num_positive_pics | ue(v) |
|     for( i = 0; i < num_negative_pics; i++ ) { | |
|       delta_poc_s0_minus1[ i ] | ue(v) |
|       used_by_curr_pic_s0_flag[ i ] | u(1) |
|     } | |
|     for( i = 0; i < num_positive_pics; i++ ) { | |
|       delta_poc_s1_minus1[ i ] | ue(v) |
|       used_by_curr_pic_s1_flag[ i ] | u(1) |
|     } | |
|   } | |
| } | |

The semantics for the additional syntax elements of Table 4 may be defined as follows:

The syntax element all_ref_pics_used_by_curr_flag in Table 4 equal to 1 may specify that all the pictures in the current RPS (with index equal to idx) may be used for reference by the current picture. All_ref_pics_used_by_curr_flag equal to 0 may specify that the used_by_curr_pic_flag[i] syntax element is signalled for all the reference pictures in the current RPS.

The syntax element used_by_curr_pic_flag[j] in Table 4 may indicate whether a picture is used for reference by the current picture.

In this manner, all_ref_pics_used_by_curr_flag represents an example of a syntax element representative of whether all reference pictures indicated as used by a current picture for the previously decoded RPS can be used as reference pictures for a picture that refers to the current RPS. When all_ref_pics_used_by_curr_flag indicates that not all of the reference pictures for the previously decoded picture can be used as reference pictures for the current picture, video encoder 20 may signal used_by_curr_pic_flag[j] (and video decoder 30 may determine that a value of used_by_curr_pic_flag[j] is signaled). Used_by_curr_pic_flag[j] represents an example of a syntax element indicative of which of the reference pictures for a current RPS can be used as reference pictures for a picture that uses the current RPS. Furthermore, video decoder 30 may be configured to form a current RPS such that the current RPS includes reference pictures that can be used as reference pictures for the current picture, as indicated by, e.g., all_ref_pics_used_by_curr_flag and, when signaled, used_by_curr_pic_flag[j] (for all values of j).

Example #5 is similar to and based on example #2. Video encoder 20 and video decoder 30 may be configured to code syntax elements in accordance with Table 5 below, when configured according to Example #5. Changes to the short-term reference picture set shown in Table 5 are highlighted with respect to Table 3 of Example #2, where underlined text represents additions relative to Table 3, and the additional syntax elements shown in Table 3 are omitted from Table 5. That is, relative to Table 3, syntax elements num_ref_pics_drops and drop_from_end_flag[i] are added, num_ref_pics_drops_from_begin and num_ref_pics_drops_from_end are removed, and other syntax elements remain unchanged.

TABLE 5

Short-term reference picture set syntax

| short_term_ref_pic_set( idx ) { | Descriptor |
|---|---|
|   inter_ref_pic_set_prediction_flag | u(1) |
|   if( inter_ref_pic_set_prediction_flag ) { | |
|     delta_rps_minus1 | ie(v) |
|     add_predictor_rps_pic_flag | u(1) |
|     _num_ref_pics_drops_ | _ue(v)_ |
|     _for( j = 0; j < num_ref_pics_drops; j++ ) {_ | |
|       _drop_from_end_flag[ i ]_ | _u(1)_ |
|     _}_ | |
|   } | |
|   else { | |
|     num_negative_pics | ue(v) |
|     num_positive_pics | ue(v) |
|     for( i = 0; i < num_negative_pics; i++ ) { | |
|       delta_poc_s0_minus1[ i ] | ue(v) |
|       used_by_curr_pic_s0_flag[ i ] | u(1) |
|     } | |
|     for( i = 0; i < num_positive_pics; i++ ) { | |
|       delta_poc_s1_minus1[ i ] | ue(v) |
|       used_by_curr_pic_s1_flag[ i ] | u(1) |
|     } | |
|   } | |
| } | |

The semantics for the additional syntax elements of Table 5 may be defined as follows:

The syntax element num_ref_pics_drops may specify the number of reference pictures in the reference RPS (with index equal to RIdx) that are not included in the current RPS (with index equal to idx). The value of num_ref_pics_drops is in the range of 0 to NumDeltaPocs[RIdx], inclusive. The length of num_ref_pics_drops is Ceil(log 2(NumDeltaPocs[RIdx]+1)) bits.

Alternatively, video encoder 20 and/or video decoder 30 may code num_ref_pics_drops as u(v) or te(v).

The syntax element drop_from_end_flag[i] equal to 1 may specify that the i-th picture not to be used to predict the current RPS (with index equal to idx) is from the end of the reference RPS (with index equal to RIdx). drop_from_end_flag[i] equal to 0 may specify that the i-th picture not to be used to predict the current RPS is from the beginning of the reference RPS. In other words, num_ref_pics_drops specifies a number of pictures to be omitted from the reference RPS, and drop_from_end_flag[i] indicates whether a particular reference picture of the reference RPS is to be omitted from the beginning of the reference RPS or the end of the reference RPS.

Accordingly num_ref_pics_drops and drop_from_end_flag[i] represent examples of syntax elements representative of a number of reference pictures for a previously decoded RPS that are to be omitted from a current reference picture set (num_ref_pics_drops) and whether the number of reference pictures proceed from the beginning of a previously decoded reference picture set or from the end of the previously decoded reference picture set (drop_from_end_ flag[i]). Moreover, video decoder 30 may be configured to form a current RPS to exclude the reference pictures of the previously decoded reference picture set that are to be omitted, as indicated by num_ref_pics_drops and drop_from_end_flag[i].

As explained above, video decoder 30 may use the data signaled according to one of Tables 2-5, to determine a reference RPS to use to form a current RPS for a current picture. Video decoder 30 may form the current RPS by including certain reference pictures of the reference RPS, omitting those reference pictures that are to be omitted, and potentially adding additional reference pictures. Video decoder 30 may further use the current RPS to form a reference picture list, and then decode the current picture using the reference picture list (and, thus, using the current RPS). For instance, video decoder 30 may decode motion information for blocks of the current picture, where the motion information may indicate the reference picture list (e.g., List 0 or List 1) and an index into the reference picture list, to identify a particular reference picture. The motion information may further include data for reconstructing a motion vector for a block to be decoded, which may indicate an offset relative to the position of the block within the reference picture, corresponding to a reference block from which video decoder 30 may retrieve pixel values for use as a predictive block for the block.

In this manner, video decoder 30 represents an example of a video decoder configured to decode one or more syntax elements of a reference picture set (RPS) prediction data structure for a current RPS, wherein at least one of the syntax elements represents a picture order count (POC) difference, form a current reference picture set based on the RPS prediction data structure, and decode a picture using the current reference picture set.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). A device including video encoder 20 and/or video decoder 30 may comprise an integrated circuit, a microprocessor, and/or a wireless communication device, such as a cellular telephone.

Figure 2:
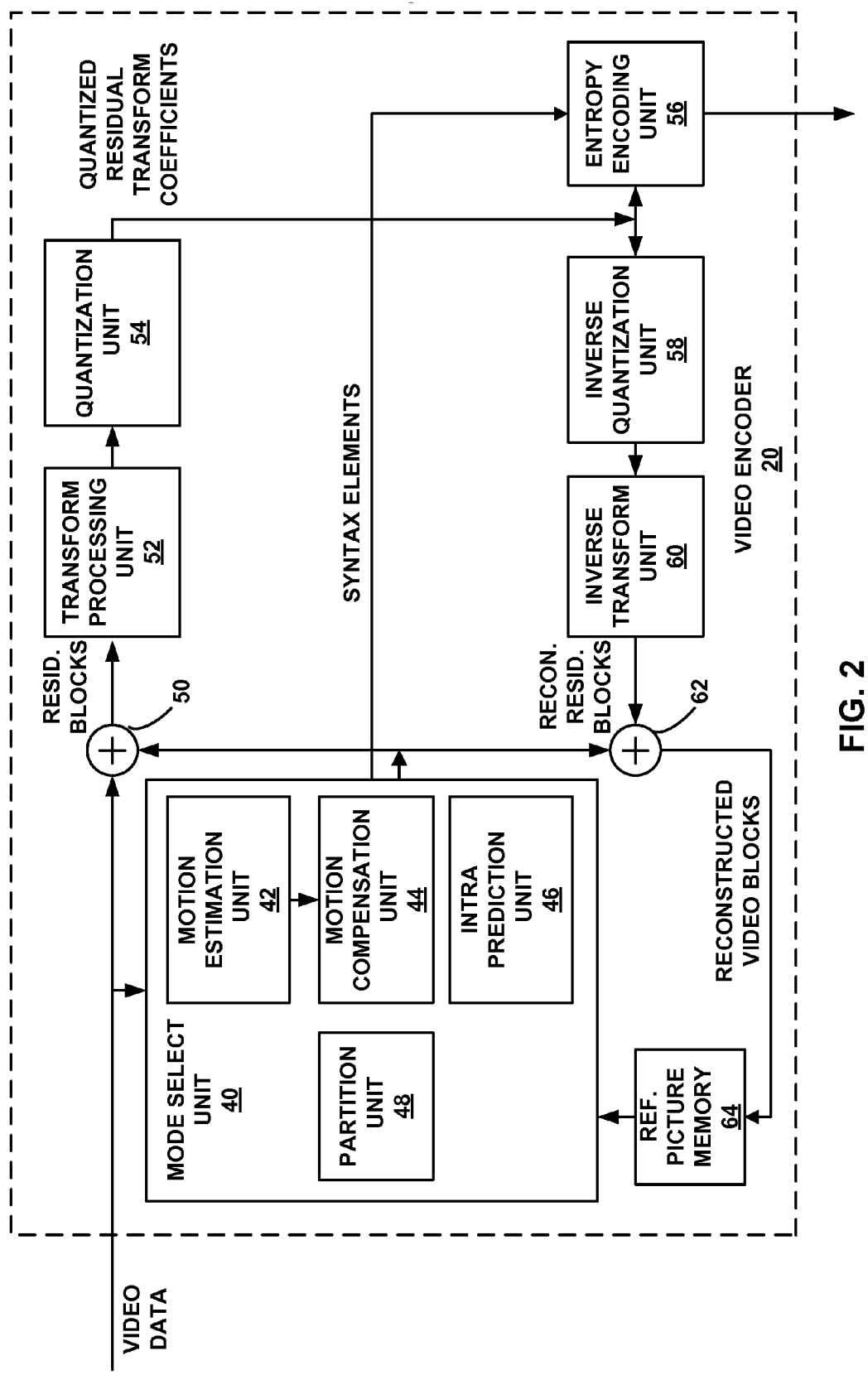
FIG. 2 is a block diagram illustrating an example of a video encoder that may implement techniques for reference picture set (RPS) prediction.

FIG. 2 is a block diagram illustrating an example of video encoder 20 that may implement techniques for reference picture set (RPS) prediction as described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 2, video encoder 20 includes mode select unit 40, reference picture memory 64, summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

In general, motion estimation unit 42 compares pixel values (also referred to as sample values) of a block corresponding to a PU to pixel values of a reference picture stored in reference picture memory 64. Motion estimation unit 42 may select different reference pictures for different blocks of an inter-coded picture or inter-coded slice. That is, one block of a current slice may be predicted from one reference picture, and another block of the current slice may be predicted from another reference picture. Mode select unit 40 may determine which reference pictures to use using, e.g., RDO analysis. The RDO analysis may include analyzing the number of bits needed to signal one or more reference pictures to be included in a reference picture set.

Video encoder 20 may encode blocks of a current picture using an inter-prediction mode, and form a reference picture set that specifies the reference pictures used to encode the blocks of the current picture. Video encoder 20 may further form a reference picture list from the reference pictures of the reference picture set. Reference picture lists may include, for example, List 0, which includes reference pictures having a display order earlier than the current picture, and List 1, which includes reference pictures having a display order later than the current picture.

As part of the encoding process, video encoder 20 may encode motion information for a block of video data that is encoded in an inter-prediction mode, e.g., P- or B-mode. The motion information may include, for example, data for a motion vector for the block, an indication of the reference picture list in which a reference picture for the block is included, and an index into the reference picture list, where the index corresponds to the position of the reference picture in the reference picture list. Therefore, it is important that information indicative of reference pictures in the reference picture set correctly specifies which reference pictures are to be included in the reference picture set, such that the reference picture list or lists can be correctly formed from the reference picture set.

In accordance with the techniques of this disclosure, video encoder 20 may encode data indicative of which reference pictures are to be included in a current reference picture set based on a previously encoded reference RPS. That is, the data may indicate whether one or more reference pictures are to be added to the reference RPS and/or whether one or more reference pictures are to be removed from the reference RPS to form the current reference picture set. For example, video encoder 20 may be configured to encode syntax elements conforming to any of Tables 2-5 discussed above.

In general, video encoder 20 may be configured to encode one or more syntax elements of a reference picture set (RPS) prediction data structure (e.g., one of Tables 2-5) for a current RPS, where the RPS prediction data structure may indicate how to form at least a portion of the reference picture set using a previously encoded reference picture set. At least one of the syntax elements may represent a picture order count (POC) difference. In particular, video encoder 20 may select a previously encoded reference picture set to use as a reference RPS for the current reference picture set, and determine a difference POC value between the current RPS and the previously encoded RPS. In this manner, video encoder 20 may specify the previously encoded reference RPS having a POC difference, relative to the current RPS, equal to the signaled POC difference.

In addition, video encoder 20 may code one or more syntax elements representative of whether the previously encoded reference RPS can be used as is, or whether the previously encoded reference RPS needs to be modified to form the current reference picture set. For instance, as explained with respect to Table 2 above, video encoder 20 may encode a syntax element representative of whether a previously encoded picture associated with the POC difference itself should be included in the reference picture set for the current picture. As another example, as explained with respect to Table 3 above, video encoder 20 may encode syntax elements indicating whether one or more pictures, starting at the beginning of the reference RPS, are to be removed and whether one or more pictures, starting at the end of the reference RPS, are to be removed.

As yet another example, as explained with respect to Table 4 above, video encoder 20 may encode a syntax element indicating whether all of the reference pictures of the reference RPS can be used as reference pictures for the current RPS. If not, video encoder 20 may encode a syntax element indicating which of the reference pictures of the reference RPS can, and which cannot, be used as reference pictures for the current RPS. Otherwise, if all of the reference pictures of the reference RPS can be used as reference pictures for the current RPS, video encoder 20 need not encode additional syntax elements.

As yet another example, as explained above with respect to Table 5, video encoder 20 may encode syntax elements indicating a number of reference pictures to be omitted from the reference RPS to form the current reference picture set, and indicating whether these reference pictures are omitted from the beginning or the end of the reference RPS.

Video encoder 20 may generally determine reference pictures to be included in the reference picture set for the current picture (e.g., pictures need as reference pictures for the current picture and/or for pictures having a later coding order than the current picture), as well as pictures that are no longer needed as reference pictures. When certain pictures are no longer needed as reference pictures, but are signaled as reference pictures in a reference RPS, video encoder 20 may code syntax elements indicating that those reference pictures that are no longer needed can be omitted from the reference picture set for the current picture, e.g., in accordance with one or more of Tables 2-5. Likewise, when certain reference pictures need to be added to the reference RPS to form the reference picture set for the current picture, video encoder 20 may signal syntax elements, e.g., in accordance with one or more of Tables 2-5, indicating that those reference pictures should be added to the reference RPS to form the current reference picture set.

As discussed above, video encoder 20 may encode motion information. In some examples, video encoder 20 may encode the motion information using merge mode. In general, merge mode encoding involves encoding a merge index, which corresponds to a spatial or temporal neighbor to the current block from which motion information is inherited. In other words, in merge mode, the current block may use the same reference picture as the neighboring block corresponding to the merge index, such that the reference picture list and reference index are the same. In other examples, video encoder 20 may encode the motion information using Advanced Motion Vector Prediction (AMVP) mode. In general, AMVP mode encoding involves encoding an AMVP index, which corresponds to a spatial or temporal neighbor to the current block from which a motion vector predictor is retrieved, calculating motion vector difference information (corresponding to differences between the motion vector for the current block and the motion vector for the block corresponding to the AMVP index), as well as encoding the reference picture list identifier and reference index.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used.

In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference picture memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference picture memory 64. The reconstructed video block may be used by motion estimation unit 42 and motion compensation unit 44 as a reference block to inter-code a block in a subsequent video frame.

In this manner, video encoder 20 represents an example of a video encoder configured to encode a current picture using one or more reference pictures, form a current reference picture set (RPS) including the one or more reference pictures, and encode one or more syntax elements of an RPS prediction data structure for the current RPS, wherein at least one of the syntax elements represents a picture order count (POC) difference between the current RPS and a previously encoded RPS, and wherein the RPS prediction data structure indicates how to form at least a portion of the current RPS using the previously encoded RPS.

Figure 3:
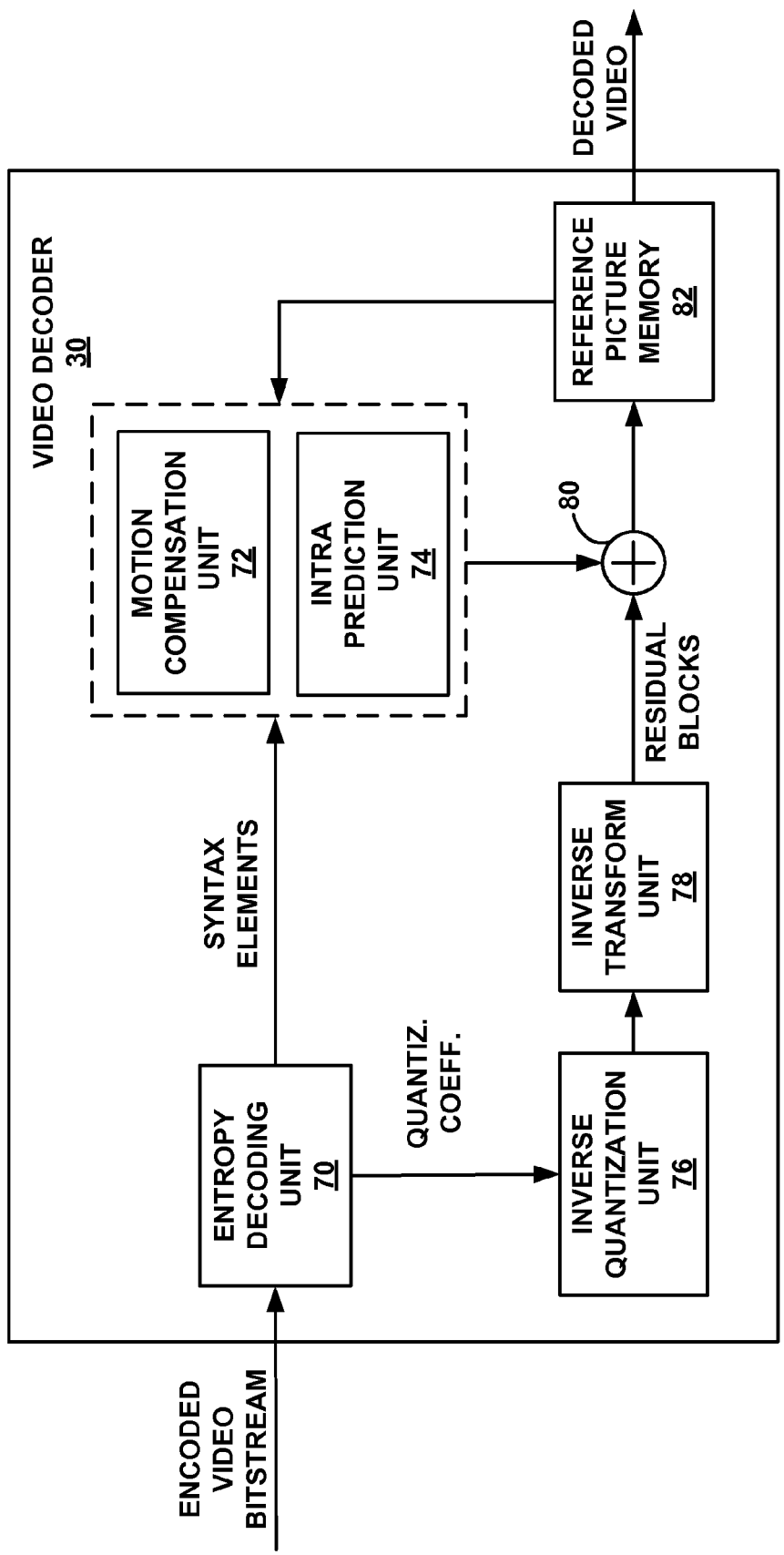
FIG. 3 is a block diagram illustrating an example of a video decoder that may implement techniques for reference picture set (RPS) prediction.

FIG. 3 is a block diagram illustrating an example of video decoder 30 that may implement techniques for reference picture set (RPS) prediction as described in this disclosure. In the example of FIG. 3, video decoder 30 includes an entropy decoding unit 70, motion compensation unit 72, intra prediction unit 74, inverse quantization unit 76, inverse transformation unit 78, reference picture memory 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference picture lists, List 0 and List 1, using default construction techniques based on reference pictures stored in reference picture memory 82.

In accordance with the techniques of this disclosure, video decoder 30 may construct reference picture lists from reference picture sets. Moreover, video decoder 30 may form a current reference picture set based on a previously decoded reference picture set. For instance, video decoder 30 may receive a reference picture set (RPS) prediction data structure (e.g., data according to one or more of Tables 2-5) that indicates the previously decoded RPS and how to form the current reference picture set based on a previously decoded reference picture set. For instance, the RPS prediction data structure may include a syntax element defining a POC difference associated between the current RPS and the previously decoded RPS. Thus, video decoder 30 may decode the POC difference and apply the POC difference to the previously decoded RPS to derive the current RPS. The syntax element delta_idx_minus1 of Tables 2-5 may define this POC difference.

Video decoder 30 may further decode one or more syntax elements of the RPS prediction data structure indicative of whether, and how, to modify the reference RPS to form a current reference picture set. For example, video decoder 30 may decode one or more syntax elements representative of whether the previously encoded reference RPS can be used as is, or whether the previously encoded reference RPS needs to be modified to form a current reference picture set. For instance, as explained with respect to Table 2 above, video decoder 30 may decode a syntax element representative of whether a previously encoded picture associated with the POC difference itself should be included in the reference picture set for the current picture. If so, video decoder 30 may form the current reference picture set by adding an identifier for the previously decoded picture to the reference RPS.

As another example, as explained with respect to Table 3 above, video decoder 30 may decode syntax elements indicating whether one or more pictures, starting at the beginning of the reference RPS, are to be removed and whether one or more pictures, starting at the end of the reference RPS, are to be removed. When the syntax elements indicate that a number of pictures should be removed from the beginning of the reference RPS, video decoder 30 may remove that number of pictures from the beginning of the reference RPS, and when the syntax elements indicate that a number of pictures should be removed from the end of the reference RPS, video decoder 30 may remove that number of pictures from the end of the reference RPS, to form the reference picture set for the current picture.

As yet another example, as explained with respect to Table 4 above, video decoder 30 may decode a syntax element indicating whether all of the reference pictures of the reference RPS can be used as reference pictures for a picture that refers to the current RPS. If so, video decoder 30 may simply use the reference RPS as the current reference picture set. On the other hand, if not all of the reference pictures in the reference RPS can be used as references for a picture that refers to the current RPS, video decoder 30 may decode syntax elements indicating which of the reference pictures of the reference RPS can, and which cannot, be used as reference pictures for a picture that refers to the current RPS. Furthermore, video decoder 30 may form the current reference picture set to include those pictures of the reference RPS that are indicated as being usable for a picture that refers to the current RPS by the syntax elements.

As yet another example, as explained above with respect to Table 5, video decoder 30 may decode syntax elements indicating a number of reference pictures to be omitted from the reference RPS to form the current reference picture set, and whether these reference pictures are omitted from the beginning or the end of the reference RPS. Video decoder 30 may then drop that number of pictures from either the beginning or the end of the reference RPS to form the current reference picture set.

Video decoder 30 may further decode motion information for a block of the current picture. The motion information may include, for example, a reference picture list and an index into the reference picture list (referred to herein as a reference index). Video decoder 30 may assemble the reference picture list from the reference picture set and determine a reference picture based on the reference picture list identifier and reference index from the motion information for the block.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., dequantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference picture memory 82 also stores decoded video for later presentation on a display device, such as display device 32 of FIG. 1.

In this manner, video decoder 30 represents an example of a video decoder configured to decode one or more syntax elements of a current reference picture set (RPS) prediction data structure, wherein at least one of the syntax elements represents a picture order count (POC) difference between the current RPS and a previously decoded RPS, form a current RPS based at least in part on the RPS prediction data structure and the previously decoded RPS, and decode one or more pictures using the current RPS.

Figure 4:
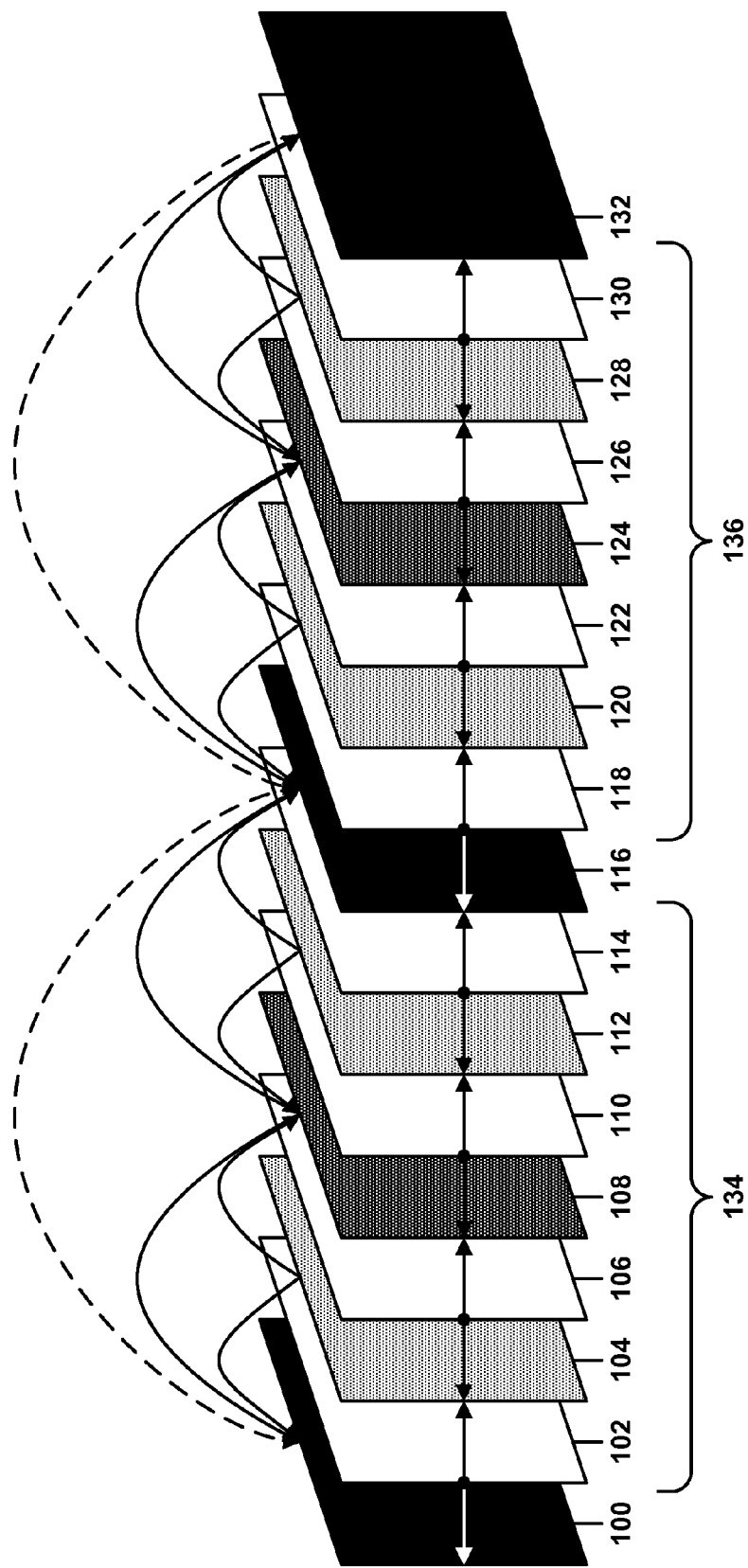
FIG. 4 is a conceptual diagram illustrating a sequence of coded video pictures.

FIG. 4 is a conceptual diagram illustrating a sequence of coded video pictures 100-132. The pictures are shaded differently to indicate positions within a hierarchical prediction structure. For example, pictures 100, 116, and 132 are shaded black to represent that pictures 100, 116, 132 are at the top of the hierarchical prediction structure. Pictures 100, 116, 132 may comprise, for example, intra-coded pictures or inter-coded pictures that are predicted from other pictures in a single direction (e.g., P-pictures). When intra-coded, pictures 100, 116, 132 are predicted solely from data within the same picture. When inter-coded, picture 116, for example, may be coded relative to data of picture 100, as indicated by the dashed arrow from picture 116 to picture 100. Pictures 116, 132 form key pictures of groups of pictures (GOPs) 134, 136, respectively.

Pictures 108, 124 are darkly shaded to indicate that they are next in the encoding hierarchy following pictures 100, 116, and 132. Pictures 108, 124 may comprise bi-directional, inter-mode prediction encoded pictures. For example, picture 108 may be predicted from data of pictures 100 and 116, while picture 124 may be predicted from pictures 116 and 132. Pictures 104, 112, 120, and 128 are lightly shaded to indicate that they are next in the encoding hierarchy following pictures 108 and 124. Pictures 104, 112, 120, and 128 may also comprise bi-directional, inter-mode prediction encoded pictures. For example, picture 104 may be predicted from pictures 100 and 108, picture 112 may be predicted from pictures 108 and 116, picture 120 may be predicted from picture 116 and 124, and picture 128 may be predicted from picture 124 and 132. In general, pictures that are lower in the hierarchy may be encoded from any reference pictures that are higher in the hierarchy, assuming that the reference pictures are still buffered in a decoded picture buffer, and assuming that the reference pictures were coded earlier than the picture currently being coded.

Finally, pictures 102, 106, 110, 114, 118, 122, 126, and 130 are shaded white to indicate that these pictures are last in the encoding hierarchy. Pictures 102, 106, 110, 114, 118, 122, 126, and 130 may be bi-directional, inter-mode prediction encoded pictures. Picture 102 may be predicted from pictures 100 and 104, picture 106 may be predicted from pictures 104 and 108, picture 110 may be predicted from pictures 108 and 112, picture 114 may be predicted from pictures 112 and 116, picture 118 may be predicted from picture 116 and 120, picture 122 may be predicted from pictures 120 and 124, picture 126 may be predicted from pictures 124 and 128, and picture 130 may be predicted from pictures 128 and 132. Again, it should be understood that pictures lower in the coding hierarchy may be coded from other pictures that are higher in the coding hierarchy. For example, any or all of pictures 102, 106, 110, or 114 may be predicted relative to any of pictures 100, 116, or 108, in addition or in the alternative.

Pictures 100-132 are illustrated in display order. That is, following decoding, picture 100 is displayed before picture 102, picture 102 is displayed before picture 104, and so on. As discussed above, POC values generally describe a display order for pictures, which is also substantially the same as the order in which raw pictures were captured or generated prior to being encoded. However, due to the encoding hierarchy, pictures 100-132 may be decoded in a different order. Moreover, while being encoded, pictures 100-132 may be arranged in decoding order in a bitstream including encoded data for pictures 100-132. For example, picture 116 may be displayed last among pictures of GOP 134. However, due to the encoding hierarchy, picture 116 may be decoded first of GOP 134. That is, in order to properly decode picture 108, for example, picture 116 may need to be decoded first, in order to act as a reference picture for picture 108. Likewise, picture 108 may act as a reference picture for pictures 104, 106, 110, and 112, and therefore may need to be decoded before pictures 104, 106, 110, and 112.

Furthermore, certain pictures may be treated as long-term reference pictures, while other pictures may be treated as short-term reference pictures. Suppose, for example, that pictures 100 and 116 represent long-term reference pictures, while pictures 108, 104, and 112 represent short-term reference pictures. It may be the case, in this example, that pictures 102 and 106 may be predicted relative to any of pictures 100, 116, 108, or 104, but that pictures 110 and 114 may be predicted relative to any of pictures 100, 116, 108, or 112. In other words, picture 104 may not be available for reference when coding pictures 110 and 114. As another example, assuming that pictures 100 and 116 represent long-term reference pictures and pictures 108, 104, and 112 represent short-term reference pictures, pictures 108, 104, and 112 may not be available for reference when coding pictures 118, 122, 126, and 130.

Video encoder 20 and video decoder 30 may be configured to inter-code all or portions of pictures 102-114, 118-130, and potentially picture 116 and/or picture 132, using a reference picture set. For instance, after coding pictures 100, 116, and 132, video encoder 20 and video decoder 30 may code picture 108. Thus, pictures 100, 116, and/or 132 may be included in a reference picture set for picture 108. After coding picture 108, video encoder 20 and video decoder 30 may proceed to code picture 104. Thus, pictures 100, 116, 132, and/or 108 may be included in the reference picture set for picture 104.

In accordance with the techniques of this disclosure, video encoder 20 and video decoder 30 may code data representative of how to construct the reference picture set for picture 104 relative to the reference picture set for a previously coded picture, e.g., picture 108. That is, video encoder 20 and video decoder 30 may treat the reference picture set for picture 108 as a reference RPS for coding the reference picture set for picture 104. In this case, assuming picture 108 has a POC value of 4 and picture 104 has a POC value of −2, video encoder 20 and video decoder 30 may calculate a POC difference of 2 for the difference between the POC values of pictures 104 and 108. This POC difference may indicate that the reference RPS for the reference picture set of picture 104 corresponds to the reference picture set of picture 108.

In addition, video encoder 20 and video decoder 30 may code syntax elements indicative of how to form the reference picture set for picture 104 relative to the reference RPS, that is, the reference picture set of picture 108, in this example. In this example, the difference between the reference picture set for picture 104 and the reference RPS is the inclusion of picture 108. Therefore, video encoder 20 and video decoder 30 may code data indicating that picture 108 is to be added to the reference RPS.

Video encoder 20 and video decoder 30 may code these syntax elements in accordance with any of the various examples explained above, or other techniques similar to such examples. For instance, with respect to Tables 2-5 above, video encoder 20 and video decoder 30 may code a value of 1 for the add_predictor_rps_pic_flag, which would indicate that picture 108 is to be added to the reference RPS, that is, the reference picture set for picture 108 in this example.

As another example, after coding picture 104, video encoder 20 and video decoder 30 may code picture 112, having a POC value of 6. Video encoder 20 and video decoder 30 may code the reference picture set for picture 112 relative to the reference picture set of picture 104. Because pictures 104 and 112 are at the same temporal layer, in this example, picture 104 need not be included in the reference picture set for picture 112. Thus, the reference picture sets for pictures 104 and 112 may be identical, assuming no reference pictures are omitted from the reference picture set of picture 104. Thus, video encoder 20 and video decoder 30 may code syntax elements representative of a POC difference of 4 (the difference in POC values between picture 112 and picture 104) and indicating that the reference picture set of picture 112 is the same as the reference RPS, that is, the reference picture set of picture 104, in this example.

For instance, with respect to Tables 2-5, video encoder 20 and video decoder 30 may code a value of 0 for the add_predictor_rps_pic_flag, in this example. Likewise, with respect to the example of Table 3, video encoder 20 and video decoder 30 may code 0 values for both the num_ref_pics_drop_from_begin and num_ref_pics_drop_from_end. With respect to the example of Table 4, video encoder 20 and video decoder 30 may code a value of 1 for the all_ref_pics_used_by_curr_flag. With respect to the example of Table 5, video encoder 20 and video decoder 30 may code a value of 0 for the num_ref_pics_drops syntax element.

As yet another example, video encoder 20 and video decoder 30 may code picture 124 after coding pictures 102-114. In this example, picture 124 may have a POC value of 12. Picture 124, and subsequent pictures in coding order (e.g., pictures 118-122 and 126-130) might not use picture 100 as a reference picture. Video encoder 20 and video decoder 30 may code the reference picture set of picture 124 with respect to the reference picture set of, e.g., picture 108. In this example, video encoder 20 and video decoder 30 may code syntax elements representing a POC difference of 8, representing the difference in POC values between picture 124 and picture 108.

Assuming that picture 100 is no longer needed as a reference picture in this example, video encoder 20 and video decoder 30 may code syntax elements indicating that picture 100 is to be omitted from the reference RPS to form the reference picture set for picture 124. For example, assuming that picture 100 is at the beginning of the reference RPS (that is, the reference picture set for picture 108), video encoder 20 and video decoder 30 may code a value of 1 for the num_ref_pics_drops_from_begin syntax element of Table 3, to indicate that picture 100 is to be omitted. As another example, with respect to Table 4, video encoder 20 and video decoder 30 may code a value of 0 for the all_ref_pics_used_by_curr_flag, a value of 0 for used_by_curr_pic_flag[0] (assuming picture 100 corresponds to an index value of j=0), and values of 1 for other used_by_curr_pic_flags (e.g., for j=1 and 2). As yet another example, with respect to Table 5, video encoder 20 and video decoder 30 may code a value of 1 for num_ref_pics_drops, and a value of 0 for drop_from_end_flag[i], assuming that picture 100 has an index value of i=0.

Figure 5:
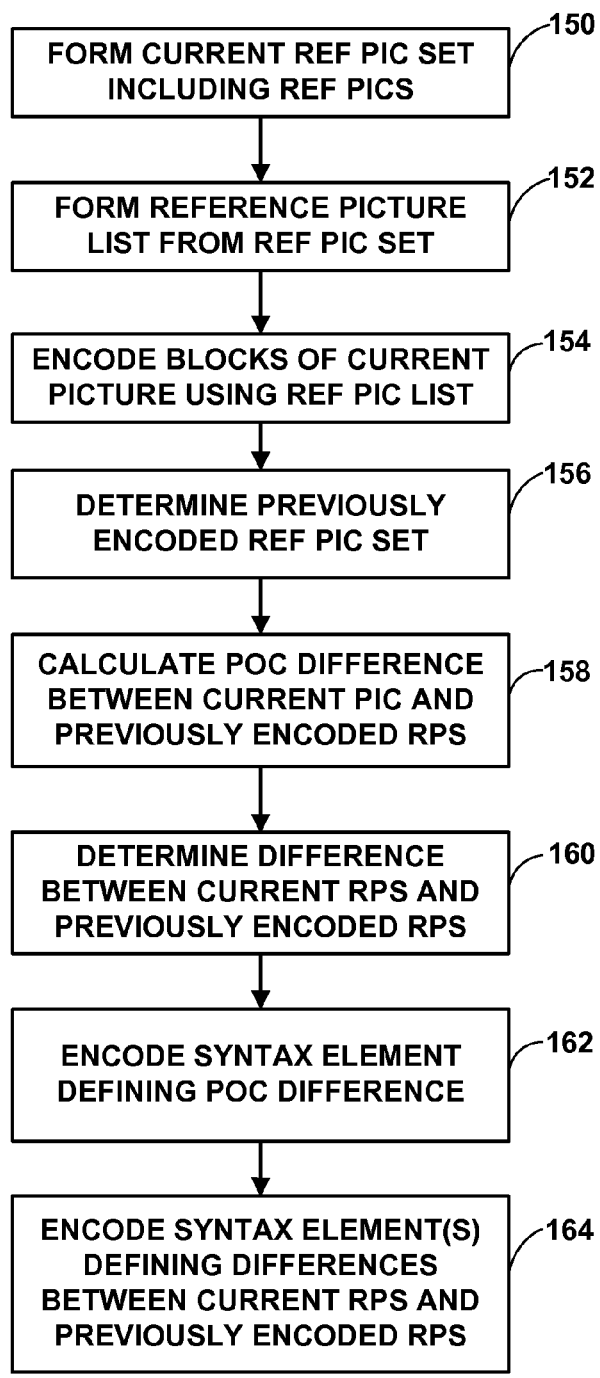
FIG. 5 is a flowchart illustrating an example method for encoding data indicative of how to form a current reference picture set in accordance with techniques of this disclosure.

FIG. 5 is a flowchart illustrating an example method for encoding data indicative of how to form a reference picture set for a current picture in accordance with techniques of this disclosure. Video encoder 20 may form a current reference picture set including one or more reference pictures for a current picture (150). In some examples, forming the current reference picture set may be performed multiple times, during multiple coding passes, e.g., from a variety of different potential reference pictures. Video encoder 20 may determine whether to include a particular reference picture in the ultimate reference picture set based on rate distortion optimization (RDO) techniques, a profile and/or level for a particular coding standard (e.g., HEVC), which may specify a maximum number of reference pictures to be stored in a decoded picture buffer at any given time, or other such characteristics.

Video encoder 20 may then form a reference picture list from the current reference picture set (152). Forming the reference picture list may be performed in accordance with the techniques of HEVC or other video coding standards for forming a reference picture list from a reference picture set. In some examples, video encoder 20 may form two reference picture lists: RefPicList0, including reference pictures having an earlier display order than the current picture, and RefPicList1, including reference pictures having a later display order than the current picture. The reference picture list formation techniques may specify a particular manner in which to order the reference pictures in the reference picture list.

Video encoder 20 may then encode blocks of a current picture using the reference picture list (154). For example, for a current block, video encoder 20 may perform a motion search in reference pictures of the reference picture list, in an attempt to find a best matching block to serve as a reference block. After identifying such a reference block, video encoder 20 may encode motion information for the current block that identifies the location of the reference block, the reference picture list in which the reference picture is included, and the index into the reference picture list corresponding to the reference picture (that is, the position of the reference picture in the reference picture list). Video encoder 20 may encode such motion information for each block that is encoded using an inter-prediction mode. Video encoder 20 may also encode certain blocks of the current picture using intra-prediction, in which case motion information need not be encoded.

Video encoder 20 may then determine a previously encoded reference picture set (e.g., a reference picture set for a previously encoded picture) to use as a reference RPS for coding the current reference picture set (156). For example, video encoder 20 may select the reference picture set for a previously encoded picture that most closely matches the current reference picture set.

Video encoder 20 may then calculate a POC difference between a POC value associated with the current RPS and a POC value associated with the determined previously encoded RPS (158). For instance, video encoder 20 may calculate the difference between the POC value for the current picture and the POC value for a previously encoded picture associated with the previously encoded RPS. Video encoder 20 may also determine differences between the current reference picture set the reference RPS (160). For instance, video encoder 20 may determine whether one or more pictures are to be added to the reference RPS, and/or whether one or more pictures are to be omitted from the reference RPS, to form the current reference picture set.

Video encoder 20 may then encode a value for a syntax element defining the calculated POC difference (162). For example, video encoder 20 may encode a value for delta_rps_minus1 of Tables 2-5. Video encoder 20 may also encode syntax elements defining differences between the RPSs, that is, the current reference picture set and the reference RPS (164). For example, video encoder 20 may encode values for one or more syntax elements as described with respect to any or all of Tables 2-5, or similar syntax elements.

In this manner, the method of FIG. 5 represents an example of a method of encoding video data including encoding a current picture using one or more reference pictures, forming a current reference picture set (RPS) including the one or more reference pictures, and encoding one or more syntax elements of an RPS prediction data structure for the current RPS, wherein at least one of the syntax elements represents a picture order count (POC) difference between the current RPS and a previously encoded RPS, and wherein the RPS prediction data structure indicates how to form at least a portion of the current RPS using the previously encoded RPS. The POC difference serves to identify the reference RPS so that the reference RPS can be readily determined.

Figure 6:
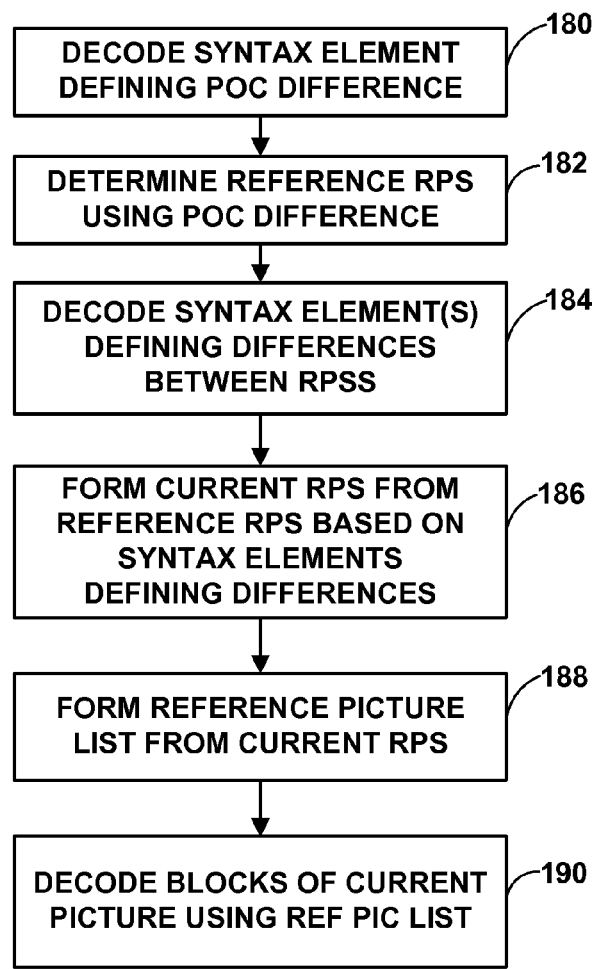
FIG. 6 is a flowchart illustrating an example method for decoding data indicative of how to form a current reference picture set in accordance with techniques of this disclosure.

FIG. 6 is a flowchart illustrating an example method for decoding data indicative of how to form a current reference picture set in accordance with techniques of this disclosure. In this example, video decoder 30 may decode a syntax element defining a POC difference between a POC value associated with a current reference picture set (RPS) and a POC value associated with a previously decoded RPS (180). For example, video decoder 30 may decode a value for delta_rps_minus1, in accordance with Tables 2-5.

Video decoder 30 may then determine a reference RPS using the POC difference (182). For example, video decoder 30 may apply the POC difference to the POC value for the current picture to determine a previously decoded picture, and determine that the reference picture set for the previously decoded picture is to be used as a reference RPS. Video decoder 30 may also decode one or more syntax elements defining differences, if any, between the current reference picture set and the reference RPS (184), where the reference RPS corresponds to the previously decoded RPS. These syntax elements may correspond to the syntax elements described with respect to Tables 2-5, or similar syntax elements. Video decoder 30 may then form a reference picture set for the current picture from the reference RPS based on the syntax elements defining the differences (186). For example, video decoder 30 may add reference pictures to the reference RPS and/or remove reference pictures from the reference RPS, e.g., as explained with respect to Tables 2-5.

Video decoder 30 may then form a reference picture list from the current RPS (188). Video decoder 30 may form the reference picture list in substantially the same manner as video encoder 20, e.g., in accordance with a video coding standard, such as HEVC. In this manner, video decoder 30 may use a reference picture list identifier and a reference index, coded in the form of motion information, to determine the reference picture used to encode a particular block, and thus, to use to decode the block. Accordingly, video decoder 30 may decode blocks of the current picture using the formed reference picture list (190). For example, for a current block of the current picture, video decoder 30 may decode motion information to determine the reference picture in which a reference block is located, and decode a motion vector to determine the location of the reference block.

In this manner, the method of FIG. 6 represents an example of a method of decoding video data, the method including decoding one or more syntax elements of a current reference picture set (RPS) prediction data structure, wherein at least one of the syntax elements represents a picture order count (POC) difference between the current RPS and a previously decoded RPS, forming a current RPS based at least in part on the RPS prediction data structure and the previously decoded RPS, and decoding one or more pictures using the current RPS.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    decoding one or more syntax elements of a current reference picture set (RPS) prediction data structure, wherein at least one of the syntax elements represents a picture order count (POC) difference between a POC value associated with a current RPS and a POC value associated with a previously decoded RPS, and wherein at least one of the syntax elements represents at least one reference picture to be included in the current RPS that is not included in the previously decoded RPS;
    forming the current RPS, wherein forming the current RPS comprises predicting the current RPS using the previously decoded RPS to form a predicted RPS, and adding an identifier of the at least one reference picture that is to be included in the current RPS and that is not included in the previously decoded RPS to the predicted RPS; and
    decoding one or more pictures using the current RPS.

2. The method of claim 1,
    wherein decoding the one or more syntax elements comprises decoding at least a first syntax element specifying a number of reference pictures, starting from the beginning of the previously decoded RPS, to be omitted from the current RPS and a second syntax element specifying a number of reference pictures, starting from the end of the previously decoded RPS, to be omitted from the current RPS, and
    wherein forming the current RPS comprises forming the current RPS to exclude the reference pictures of the previously decoded RPS that are to be omitted as indicated by the first syntax element and the second syntax element.

3. The method of claim 1,
wherein decoding the one or more syntax elements comprises:
decoding at least one syntax element representative of whether all reference pictures for the previously decoded RPS can be used as reference pictures for the current RPS; and
when the at least one of the syntax elements indicates that not all of the reference pictures for the previously decoded RPS can be used as reference pictures for the current RPS, decoding one or more syntax elements indicative of which of the reference pictures for the previously decoded RPS can be used as reference pictures for the current RPS, and
wherein forming the current RPS comprises forming the current RPS such that the current RPS includes the reference pictures that can be used as reference pictures for the picture that uses the current RPS.

4. The method of claim 1,
wherein decoding the one or more syntax elements comprises decoding one or more syntax elements representative of a number of reference pictures for the previously decoded RPS that are to be dropped for the current RPS and whether a particular reference picture is to be dropped from the beginning of a previously decoded RPS or from the end of the previously decoded RPS, and
wherein forming the current RPS comprises forming the current RPS such that the current RPS excludes the reference pictures that are to be dropped.

5. The method of claim 1, further comprising:
applying the POC difference to the POC value associated with the current RPS to determine the POC value associated with the previously decoded RPS; and
identifying the previously decoded RPS using the POC value associated with the previously decoded RPS.

6. The method of claim 1, wherein decoding one or more pictures comprises decoding a current picture, comprising:
forming a reference picture list using the current RPS;
decoding motion information for a block of the current picture, wherein the motion information includes data identifying a reference picture in the reference picture list; and
decoding the block using data of the picture identified by the motion information.

7. A device for decoding video data, the device comprising:
a memory configured to store video data; and
a video decoder configured to:
decode one or more syntax elements of a current reference picture set (RPS) prediction data structure, wherein at least one of the syntax elements represents a picture order count (POC) difference between a POC value associated with a current RPS and a POC value associated with a previously decoded RPS, and wherein at least one of the syntax elements represents at least one reference picture to be included in the current RPS and that is not included in the previously decoded RPS,
form the current RPS, wherein to form the current RPS, the video decoder is configured to predict the current RPS using the previously decoded RPS to form a predicted RPS, and add an identifier of the at least one reference picture that is to be included in the current RPS and that is not included in the previously decoded RPS to the predicted RPS, and
decode one or more pictures of the video data using the current RPS.

8. The device of claim 7, wherein the video decoder is configured to decode at least a first syntax element specifying a number of reference pictures, starting from the beginning of a previously decoded RPS, to be omitted from the current RPS and a second syntax element specifying a number of reference pictures, starting from the end of the previously decoded RPS, to be omitted from the current RPS, and to form the current RPS to exclude the reference pictures of the previously decoded RPS that are to be omitted as indicated by the first syntax element and the second syntax element.

9. The device of claim 7, wherein the video decoder is configured to decode at least one syntax element representative of whether all reference pictures for the previously decoded RPS can be used as reference pictures for the current RPS, and when the at least one of the syntax elements indicates that not all of the reference pictures for the previously decoded RPS can be used as reference pictures for the current RPS, decode one or more syntax elements indicative of which of the reference pictures for the previously decoded RPS can be used as reference pictures for the current RPS, and to form the current RPS such that the current RPS includes the reference pictures that can be used as reference pictures for a picture that refers to the current RPS.

10. The device of claim 7, wherein the video decoder is configured to decode one or more syntax elements representative of a number of reference pictures for the previously decoded RPS that are to be dropped from the current RPS and whether a particular reference picture is to be dropped from the beginning of a previously decoded RPS or from the end of the previously decoded RPS, and to form the current RPS such that the current RPS excludes the reference pictures that are to be dropped.

11. The device of claim 7, wherein the video decoder is configured to form a reference picture list using the current RPS, decode motion information for a block of a current picture, wherein the motion information includes data identifying a reference picture in the reference picture list, and decode the block using data of the picture identified by the motion information.

12. The device of claim 7, wherein the video decoder is configured to apply the POC difference to the POC value associated with the current RPS to determine the POC value associated with the previously decoded RPS, and identify the previously decoded RPS using the POC value associated with the previously decoded RPS.

13. The device of claim 7, wherein the device comprises at least one of:
an integrated circuit;
a microprocessor; and
a wireless communication device.

14. A device for decoding video data, the device comprising:
means for decoding one or more syntax elements of a current reference picture set (RPS) prediction data structure, wherein at least one of the syntax elements represents a picture order count (POC) difference between a POC value associated with a current RPS and a POC value associated with a previously decoded RPS, and wherein at least one of the syntax elements represents at least one reference picture to be included in the current RPS and that is not included in the previously decoded RPS;

means for forming the current RPS, wherein the means for forming the current RPS comprises means for predicting the current RPS using the previously decoded RPS to form a predicted RPS, and means for adding an identifier of the at least one reference picture that is to be included in the current RPS and that is not included in the previously decoded RPS to the predicted RPS; and means for decoding one or more pictures using the current RPS.

15. The device of claim 14,
wherein the means for decoding the one or more syntax elements comprises means for decoding at least a first syntax element specifying a number of reference pictures, starting from the beginning of the previously decoded RPS, to be omitted from the current RPS and a second syntax element specifying a number of reference pictures, starting from the end of the previously decoded RPS, to be omitted from the current RPS, and
wherein the means for forming the current RPS comprises means for forming the current RPS to exclude the reference pictures of the previously decoded RPS that are to be omitted as indicated by the first syntax element and the second syntax element.

16. The device of claim 14,
wherein the means for decoding the one or more syntax elements comprises:
  means for decoding at least one syntax element representative of whether all reference pictures for the previously decoded RPS can be used as reference pictures for the current RPS; and
  means for decoding, when the at least one of the syntax elements indicates that not all of the reference pictures for the previously decoded RPS can be used as reference pictures for the current RPS, one or more syntax elements indicative of which of the reference pictures for the previously decoded RPS can be used as reference pictures for the current RPS, and
wherein the means for forming the current RPS comprises means for forming the current RPS such that the current RPS includes the reference pictures that can be used as reference pictures for the picture that uses the current RPS.

17. The device of claim 14,
wherein the means for decoding the one or more syntax elements comprises means for decoding one or more syntax elements representative of a number of reference pictures for the previously decoded RPS that are to be dropped for the current RPS and whether a particular reference picture is to be dropped from the beginning of a previously decoded RPS or from the end of the previously decoded RPS, and
wherein the means for forming the current RPS comprises means for forming the current RPS such that the current RPS excludes the reference pictures that are to be dropped.

18. A non-transitory computer-readable storage medium having stored thereon instructions that, when executed, cause a processor to:
  decode one or more syntax elements of a current reference picture set (RPS) prediction data structure, wherein at least one of the syntax elements represents a picture order count (POC) difference between a POC value associated with a current RPS and a POC value associated with a previously decoded RPS, and wherein at least one of the syntax elements represents at least one reference picture to be included in the current RPS and that is not included in the previously decoded RPS;
  form the current RPS, wherein the instructions that cause the processor to form the current RPS comprise instructions that cause the processor to predict the current RPS using the previously decoded RPS to form a predicted RPS, and add an identifier of the at least one reference picture that is to be included in the current RPS and that is not included in the previously decoded RPS to the predicted RPS; and
  decode one or more pictures using the current RPS.

19. The non-transitory computer-readable storage medium of claim 18,
wherein the instructions that cause the processor to decode the one or more syntax elements comprise instructions that cause the processor to decode at least a first syntax element specifying a number of reference pictures, starting from the beginning of the previously decoded RPS, to be omitted from the current RPS and a second syntax element specifying a number of reference pictures, starting from the end of the previously decoded RPS, to be omitted from the current RPS, and
wherein the instructions that cause the processor to form the current RPS comprise instructions that cause the processor to form the current RPS to exclude the reference pictures of the previously decoded RPS that are to be omitted as indicated by the first syntax element and the second syntax element.

20. The non-transitory computer-readable storage medium of claim 18,
wherein the instructions that cause the processor to decode the one or more syntax elements comprise instructions that cause the processor to:
  decode at least one syntax element representative of whether all reference pictures for the previously decoded RPS can be used as reference pictures for the current RPS; and
  when the at least one of the syntax elements indicates that not all of the reference pictures for the previously decoded RPS can be used as reference pictures for the current RPS, decode one or more syntax elements indicative of which of the reference pictures for the previously decoded RPS can be used as reference pictures for the current RPS, and
wherein the instructions that cause the processor to form the current RPS comprise instructions that cause the processor to form the current RPS such that the current RPS includes the reference pictures that can be used as reference pictures for the picture that uses the current RPS.

21. The non-transitory computer-readable storage medium of claim 18,
wherein the instructions that cause the processor to decode the one or more syntax elements comprise instructions that cause the processor to decode one or more syntax elements representative of a number of reference pictures for the previously decoded RPS that are to be dropped for the current RPS and whether a particular reference picture is to be dropped from the beginning of a previously decoded RPS or from the end of the previously decoded RPS, and
wherein the instructions that cause the processor to form the current RPS comprise instructions that cause the processor to form the current RPS such that the current RPS excludes the reference pictures that are to be dropped.

22. A method of encoding video data, the method comprising:
- encoding a current picture using one or more reference pictures;
- forming a current reference picture set (RPS) including the one or more reference pictures; and
- encoding one or more syntax elements of an RPS prediction data structure for the current RPS, wherein at least one of the syntax elements represents a picture order count (POC) difference between a POC value associated with the current RPS and a POC value associated with a previously encoded RPS, wherein the RPS prediction data structure indicates how to form at least a portion of the current RPS using the previously encoded RPS, and wherein at least one of the syntax elements represents at least one reference picture to be included in the current RPS and that is not included in the previously decoded RPS.

23. The method of claim 22, wherein encoding the one or more syntax elements comprises encoding at least one syntax element representative of whether a previously encoded picture associated with the POC difference is to be included in the current RPS.

24. The method of claim 22, wherein encoding the one or more syntax elements comprises encoding at least a first syntax element specifying a number of reference pictures, starting from the beginning of the previously encoded RPS, to be omitted from the current RPS and a second syntax element specifying a number of reference pictures, starting from the end of the previously encoded RPS, to be omitted from the current RPS.

25. The method of claim 22, wherein encoding the one or more syntax elements comprises:
- encoding at least one syntax element representative of whether all reference pictures for the previously encoded RPS can be used as reference pictures for the current RPS; and
- when not all of the reference pictures for the previously encoded picture can be used as reference pictures for the current picture, encoding one or more syntax elements indicative of which of the reference pictures for the previously encoded RPS can be used as reference pictures for the current RPS.

26. The method of claim 22, wherein encoding the one or more syntax elements comprises encoding one or more syntax elements representative of a number of reference pictures for the previously encoded RPS that are to be dropped for the current RPS and whether a particular reference picture is to be dropped from the beginning of a previously encoded RPS or from the end of the previously encoded RPS.

27. The method of claim 22, further comprising:
- determining the POC value associated with the current RPS;
- determining the POC value associated with the previously encoded RPS; and
- calculating the POC difference as the difference between the POC value associated with the current RPS and the POC value associated with the previously encoded RPS.

28. The method of claim 22, wherein encoding the current picture comprises:
- forming a reference picture list using the current RPS;
- predicting a block of the current picture using a reference picture in the reference picture list; and
- encoding motion information for the block, wherein the motion information includes data identifying the reference picture in the reference picture list.

29. A device for encoding video data, the device comprising:
- a memory configured to store video data; and
- a video encoder configured to:
  - encode a current picture of the video data using one or more reference pictures,
  - form a current reference picture set (RPS) including the one or more reference pictures, and
  - encode one or more syntax elements of an RPS prediction data structure for the current RPS, wherein at least one of the syntax elements represents a picture order count (POC) difference between a POC value associated with the current RPS and a POC value associated with a previously encoded RPS, wherein the RPS prediction data structure indicates how to form at least a portion of the current RPS using the previously encoded RPS, and wherein at least one of the syntax elements represents at least one reference picture to be included in the current RPS and that is not included in the previously decoded RPS.

30. The device of claim 29, wherein the video encoder is configured to encode at least one syntax element representative of whether a previously encoded picture is to be included in the current RPS.

31. The device of claim 29, wherein the video encoder is configured to encode at least a first syntax element specifying a number of reference pictures, starting from the beginning of the previously encoded RPS, to be omitted from the current RPS and a second syntax element specifying a number of reference pictures, starting from the end of the previously encoded RPS, to be omitted from the current RPS.

32. The device of claim 29, wherein the video encoder is configured to encode at least one syntax element representative of whether all reference pictures for the previously encoded RPS can be used as reference pictures for the current RPS, and, when not all of the reference pictures for the previously encoded picture can be used as reference pictures for the current picture, encode one or more syntax elements indicative of which of the reference pictures for the previously encoded RPS can be used as reference pictures for the current RPS.

33. The device of claim 29, wherein the video encoder is configured to encode one or more syntax elements representative of a number of reference pictures for the previously encoded RPS that are to be dropped for the current RPS and whether a particular reference picture is to be dropped from the beginning of a previously encoded RPS or from the end of the previously encoded RPS.

34. The device of claim 29, wherein the video encoder is configured to form a reference picture list using the current RPS, predict a block of the current picture using a reference picture in the reference picture list, and encode motion information for the block, wherein the motion information includes data identifying the reference picture in the reference picture list.

35. The device of claim 29, wherein the device comprises at least one of:
- an integrated circuit;
- a microprocessor; and
- a wireless communication device.

* * * * *